(12) United States Patent
Billings

(10) Patent No.: US 10,643,238 B2
(45) Date of Patent: May 5, 2020

(54) NON-INTRUSIVE ADVERTISEMENT PRESENTATION

(75) Inventor: Allen Billings, Albany, CA (US)

(73) Assignee: MobiTV, Inc., Emeryville, CA (US)

( * ) Notice: Subject to any disclaimer, the term of this patent is extended or adjusted under 35 U.S.C. 154(b) by 726 days.

(21) Appl. No.: 12/941,908

(22) Filed: Nov. 8, 2010

(65) Prior Publication Data

US 2012/0116881 A1    May 10, 2012

(51) Int. Cl.
*G06Q 30/00*    (2012.01)
*G06Q 30/02*    (2012.01)

(52) U.S. Cl.
CPC ......... *G06Q 30/0257* (2013.01); *G06Q 30/02* (2013.01); *G06Q 30/0269* (2013.01); *G06Q 30/0277* (2013.01)

(58) Field of Classification Search
CPC .................. G06Q 30/0207–30/0277
USPC ......... 715/835; 725/34; 709/219; 455/414.1; 705/14.55
See application file for complete search history.

(56) References Cited

U.S. PATENT DOCUMENTS

| | | | | |
|---|---|---|---|---|
| 5,999,526 | A * | 12/1999 | Garland | H04M 11/06 370/352 |
| 6,374,102 | B1 * | 4/2002 | Brachman | H04W 76/00 455/422.1 |
| 6,496,857 | B1 * | 12/2002 | Dustin et al. | 709/219 |
| 6,993,326 | B2 * | 1/2006 | Link et al. | 455/414.1 |
| 2002/0087978 | A1 * | 7/2002 | Nicholson et al. | 725/34 |
| 2002/0107832 | A1 * | 8/2002 | Shimizu | G06Q 30/0641 |
| 2003/0163811 | A1 * | 8/2003 | Luehrs | H04N 5/44543 725/25 |
| 2004/0078829 | A1 * | 4/2004 | Patel | G06F 3/0482 725/135 |
| 2008/0193104 | A1 * | 8/2008 | Hasek | H04N 5/783 386/291 |
| 2009/0183199 | A1 * | 7/2009 | Stafford | H04H 60/375 725/34 |
| 2009/0265665 | A1 * | 10/2009 | Martiros | 715/835 |
| 2011/0137976 | A1 * | 6/2011 | Poniatowski | H04N 21/42203 709/203 |
| 2012/0072272 | A1 * | 3/2012 | Kilar | G06Q 30/02 705/14.4 |

(Continued)

OTHER PUBLICATIONS

Kumar; Blocking Online Advertsing; Curtin University of Technology; IEEE 2009; 10 pages; 2009.*

(Continued)

*Primary Examiner* — Radu Andrei
(74) *Attorney, Agent, or Firm* — Kwan & Olynick LLP

(57) ABSTRACT

Advertisements are often presented in the context of a media content viewing experience. Advertisement presentation may be intrusive or subtle. In many instances, users may be interested in particular advertisements but may not want to disrupt a media content viewing experience by launching an advertisement window, opening an advertisement application, or otherwise being redirected to another piece of content. Consequently, mechanisms are provided to allow a user to identify advertisements or save advertisement interests for presentation at a later time. Saved advertisement interests can be used to inform future advertisement and/or content suggestions, and the user can be presented with selected advertisements within an application or through external mechanisms.

12 Claims, 5 Drawing Sheets

(56) References Cited

U.S. PATENT DOCUMENTS

| | | | | |
|---|---|---|---|---|
| 2012/0072286 A1* | 3/2012 | Kilar | ...................... | G06Q 30/02 |
| | | | | 705/14.55 |
| 2012/0110615 A1* | 5/2012 | Kilar | ...................... | G06Q 30/02 |
| | | | | 725/32 |
| 2012/0110616 A1* | 5/2012 | Kilar | .................... | H04N 21/812 |
| | | | | 725/32 |
| 2012/0110618 A1* | 5/2012 | Kilar | ................. | H04N 21/4755 |
| | | | | 725/34 |
| 2012/0110619 A1* | 5/2012 | Kilar | ...................... | G06Q 30/02 |
| | | | | 725/34 |
| 2012/0110620 A1* | 5/2012 | Kilar | ...................... | G06Q 30/02 |
| | | | | 725/34 |
| 2013/0086607 A1* | 4/2013 | Tom | .................. | G06Q 30/0241 |
| | | | | 725/32 |

OTHER PUBLICATIONS

Cho; New Content-Relatted Advertsing Model; Korea Institute of Science and Technology 2008; 9 pages, 2008.*

Kramer; Effective Defence Against Intrusive Web Advertising; Viena University of Technology; IEEE Conferenece on Privacy, Secuirty and Trust; p. 3-p. 14; 2008.* http://artivision.com/images/upload/file/PressReleases/ArtivisionMedia_APR.pdf, Retrieved from internet Jul. 12, 2013.

Li, Hairong et al., "Measuring the Intrusiveness of Advertisements: Scall Development and Validation", http://interruptions.net/literature/Li-JA02.pdf, Retrieved from Internet, 2002, 11 pgs.

\* cited by examiner

NON-INTRUSIVE ADVERTISEMENT PRESENTATION

DESCRIPTION OF RELATED ART

The present disclosure relates to presentation of advertisements in a non-intrusive manner.

DESCRIPTION OF RELATED ART

Mechanisms for advertisement presentation are often intrusive or ineffective. In some instances, a user content viewing experience is disrupted as advertisements are presented in place of content during predetermined periods of time. In other instances, a user content viewing experience can continue while advertising is presented in a subtle manner along with the content. Users may select particular advertisements and a selection will expand an advertisement in a new window or direct a viewer to another piece of content.

However, mechanisms for advertisement presentation are limited. Consequently, the techniques and mechanisms of the present invention provide improved mechanisms for non-intrusive advertisement presentation.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
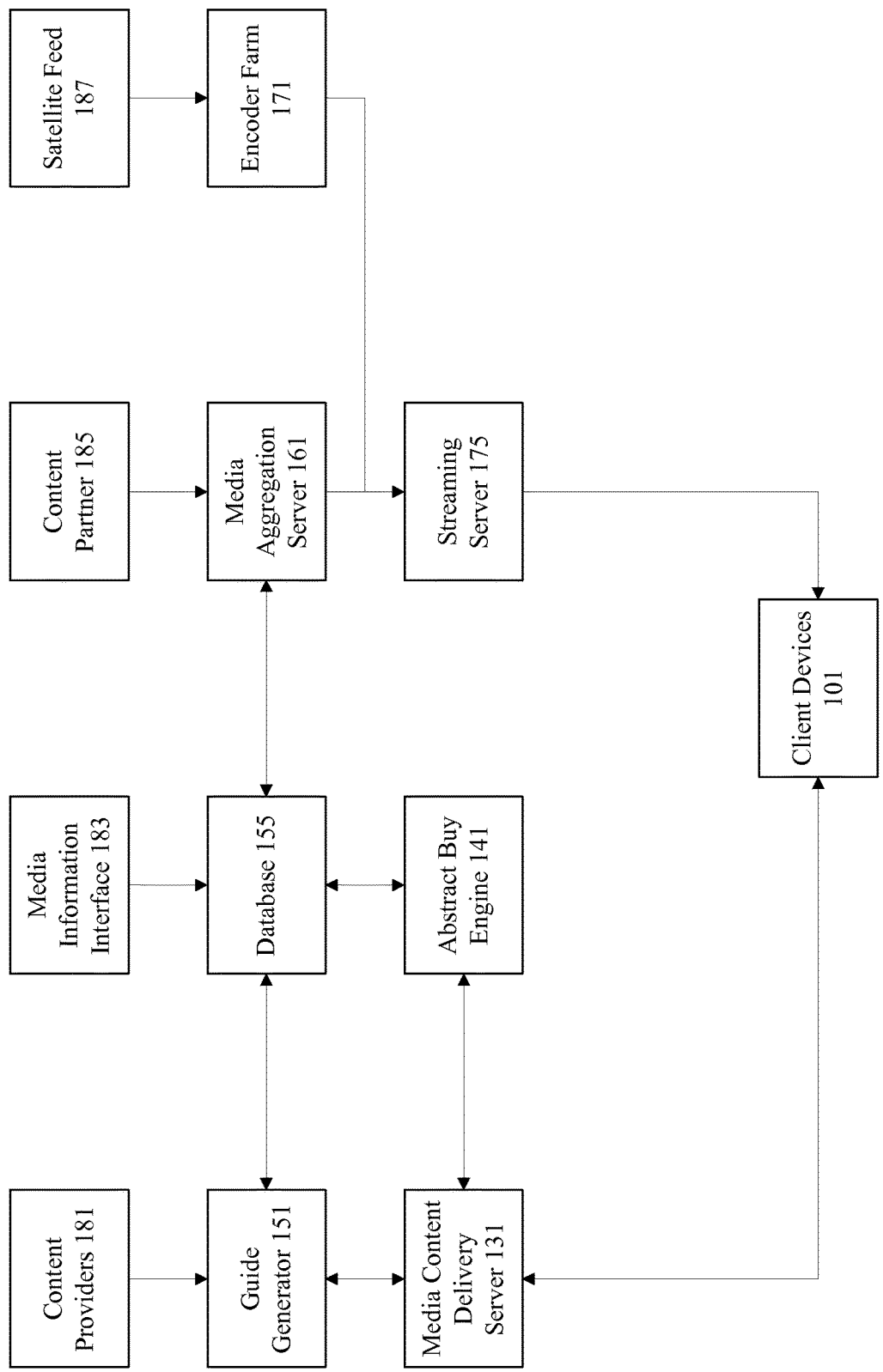
FIG. 1 illustrates a particular example of a network that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular advertisements. However, it should be noted that the techniques and mechanisms of the present invention can be used with a variety of different types of advertisements. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Advertisements are often presented in the context of a media content viewing experience. Advertisement presentation may be intrusive or subtle. In many instances, users may be interested in particular advertisements but may not want to disrupt a media content viewing experience by launching an advertisement window, opening an advertisement application, or otherwise being redirected to another piece of content. Consequently, mechanisms are provided to allow a user to identify advertisements or save advertisement interests for presentation at a later time. Saved advertisement interests can be used to inform future advertisement and/or content suggestions, and the user can be presented with selected advertisements within an application or through external mechanisms.

Example Embodiments

The ability to provide advertising that meets the interests of a user can be extremely valuable. Existing systems rely on explicit and implicit user expression of interest in advertising. A user may explicitly identify subject matters, activities, topics, and keywords of interest. A user may also implicitly identify areas of interests based on content being viewed or material being typed for other purposes. In both of these cases, relatively targeted advertising can be generated and presented to a user.

Many existing mechanisms for presenting advertising are either intrusive or subtle. Intrusive advertising will disrupt content viewing by either replacing or supplanting it by launching a new window. Commercials and popup windows fall into the category of intrusive advertising. A viewing experience is disrupted intentionally to direct attention to a subject of advertising. However, intrusive advertising reduces user satisfaction levels, and leads to use of mechanisms to circumvent disruptive advertising, including popup blockers and digital video recorders. In some instances, a user may actually be interested in the advertisement, but may not want the advertisement disrupting the flow of a media program.

Subtle advertising does not disrupt the flow of a program, but may not be as effective. Advertisements may be included along the periphery of a program window or may even be blended with the content itself. However, the subtle advertising may not attract sufficient attention. In particular instances, if a user is interested in an advertisement, the user can select or click the advertisement that would then expand or launch in a new viewable area.

Consequently, the techniques and mechanisms of the present invention allow users to save advertisements, links to advertisements, or links to more information about advertisements. When an advertisement (e.g. video advertisement, banner, billboard, etc.) is presented within an application (e.g. mobile application, browser/web application, computer application, set-top-box application, Internet TV application, etc.), the user has the option to save the advertisement and/or related information.

In particular embodiments, saved advertisements can be explored at a later time. Users can access a list of saved advertisements from within the application and replay or select more information about the advertisement to access additional content related to the advertisement. The application can also link to a browser or external application to consume additional content related to the advertisement. In particular embodiments, the application can present reminders to the user about the advertisements, replay the advertisements during subsequent usage, or send out push messages, SMS messages, or email messages with the list of advertisements or with a link to the list of advertisements.

According to various embodiments, the user is presented with a list of all advertisements that have been displayed to the user while using the service. The user can access a list of advertisements that have been displayed while using the service, and can select from this list specific advertisements to explore further, or add one or more advertisements to the user's saved advertisements. In particular embodiments, advertisements can be shared or identified as interesting to other users of a social network.

FIG. 1 is a diagrammatic representation showing one example of a network that can use the techniques of the present invention. According to various embodiments, media content is provided from a number of different sources 185. Media content may be provided from film libraries, cable companies, movie and television studios, commercial and business users, etc. and maintained at a media aggregation server 161. Any mechanism for obtaining media content from a large number of sources in order to provide the media content to mobile devices in live broadcast streams is referred to herein as a media content aggregation server. The media content aggregation server 161 may be clusters of servers located in different data centers. According to various embodiments, content provided to a media aggregation server 161 is provided in a variety of different encoding formats with numerous video and audio codecs. Media content may also be provided via satellite feed 157.

An encoder farm 171 is associated with the satellite feed 187 and can also be associated with media aggregation server 161. The encoder farm 171 can be used to process media content from satellite feed 187 as well as possibly from media aggregation server 161 into potentially numerous encoding formats. According to various embodiments, file formats include open standards MPEG-1 (ISO/IEC 11172), MPEG-2 (ISO/IEC 13818-2), MPEG-4 (ISO/IEC 14496), as well as proprietary formats QuickTime™, ActiveMovie™, and RealVideo™. Some example video codecs used to encode the files include MPEG-4, H.263, and H.264. Some example audio codecs include Qualcomm Purevoice™ (QCELP), The Adaptive Multi—Narrow Band (AMR-NB), Advanced Audio coding (AAC), and AACPlus. The media content may also be encoded to support a variety of data rates. The media content from media aggregation server 161 and encoder farm 171 is provided as live media to a streaming server 175. In one example, the streaming server is a Real Time Streaming Protocol (RTSP) server 175. Media streams are broadcast live from an RTSP server 175 to individual client devices 101. A variety of protocols can be used to send data to client devices.

Possible client devices 101 include personal digital assistants (PDAs), cellular phones, personal computing devices, personal computers etc. According to various embodiments, the client devices are connected to a cellular network run by a cellular service provider. In other examples, the client devices are connected to an Internet Protocol (IP) network. Alternatively, the client device can be connected to a wireless local area network (WLAN) or some other wireless network. Live media streams provided over RTSP are carried and/or encapsulated on one of a variety of wireless networks.

The client devices are also connected over a wireless network to a media content delivery server 131. The media content delivery server 131 is configured to allow a client device 101 to perform functions associated with accessing live media streams. For example, the media content delivery server allows a user to create an account, perform session identifier assignment, subscribe to various channels, log on, access program guide information, obtain information about media content, etc. According to various embodiments, the media content delivery server does not deliver the actual media stream, but merely provides mechanisms for performing operations associated with accessing media. In other implementations, it is possible that the media content delivery server also provides media clips, files, and streams. The media content delivery server is associated with a guide generator 151. The guide generator 151 obtains information from disparate sources including content providers 181 and media information sources 183. The guide generator 151 provides program guides to database 155 as well as to media content delivery server 131 to provide to client devices 101.

According to various embodiments, the guide generator 151 obtains viewership information from individual client devices. In particular embodiments, the guide generation 151 compiles viewership information in real-time in order to generate a most-watched program guide listing most popular programs first and least popular programs last. The client device 101 can request program guide information and the most-watched program guide can be provided to the client device 101 to allow efficient selection of video content. According to various embodiments, guide generator 151 is connected to a media content delivery server 131 that is also associated with an abstract buy engine 141. The abstract buy engine 141 maintains subscription information associated with various client devices 101. For example, the abstract buy engine 141 tracks purchases of premium packages.

The media content delivery server 131 and the client devices 101 communicate using requests and responses. For example, the client device 101 can send a request to media content delivery server 131 for a subscription to premium content. According to various embodiments, the abstract buy engine 141 tracks the subscription request and the media content delivery server 131 provides a key to the client device 101 to allow it to decode live streamed media content. Similarly, the client device 101 can send a request to a media content delivery server 131 for a most-watched program guide for its particular program package. The media content delivery server 131 obtains the guide data from the guide generator 151 and associated database 155 and provides appropriate guide information to the client device 101.

Although the various devices such as the guide generator 151, database 155, media aggregation server 161, etc. are shown as separate entities, it should be appreciated that various devices may be incorporated onto a single server.

Alternatively, each device may be embodied in multiple servers or clusters of servers. According to various embodiments, the guide generator 151, database 155, media aggregation server 161, encoder farm 171, media content delivery server 131, abstract buy engine 141, and streaming server 175 are included in an entity referred to herein as a media content delivery system.

Figure 2:
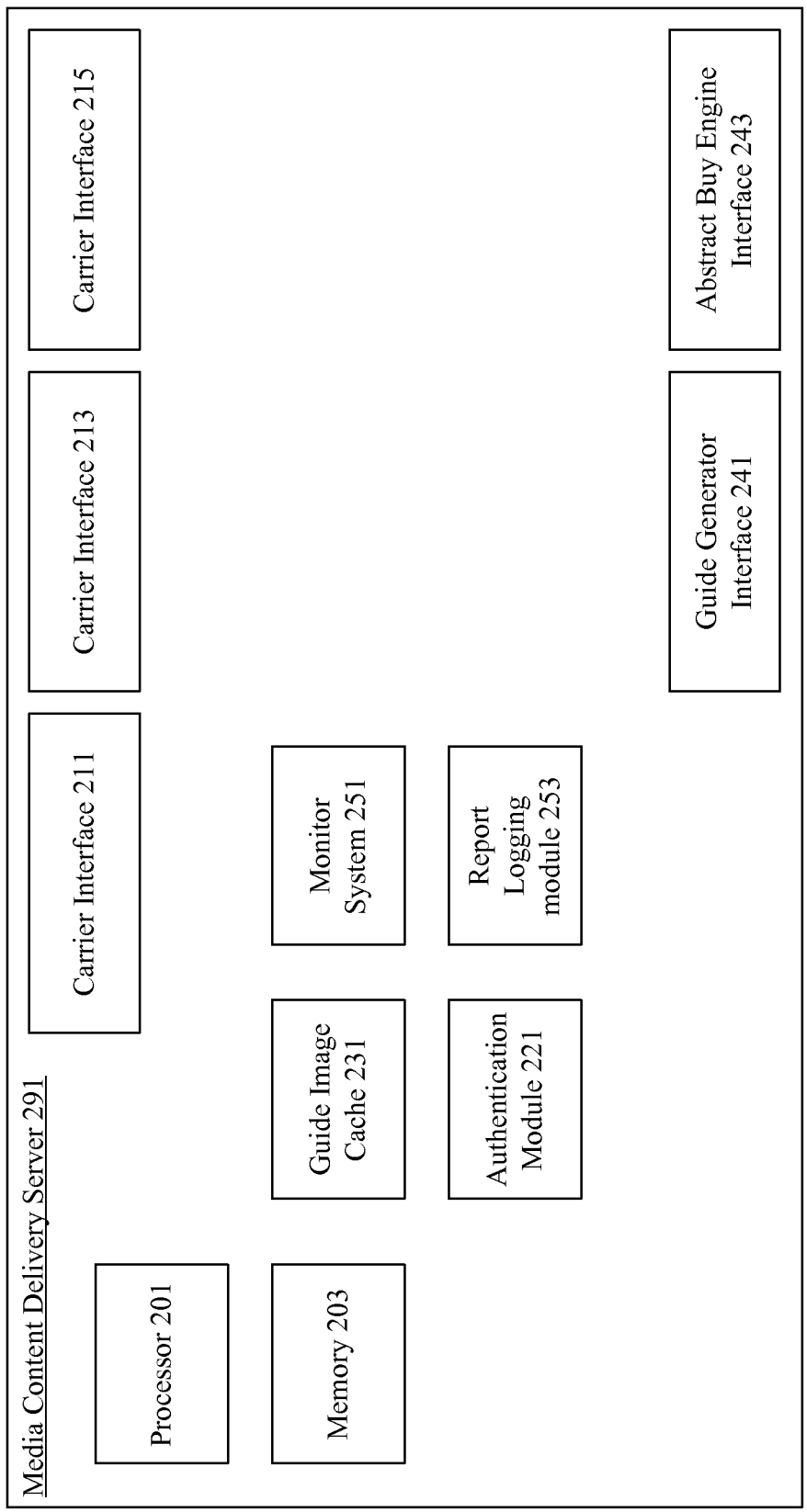
FIG. 2 illustrates a particular example of a content delivery server.

FIG. 2 is a diagrammatic representation showing one example of a media content delivery server 291. According to various embodiments, the media content delivery server 291 includes a processor 201, memory 203, and a number of interfaces. In some examples, the interfaces include a guide generator interface 241 allowing the media content delivery server 291 to obtain program guide information. The media content delivery server 291 also can include a program guide cache 231 configured to store program guide information and data associated with various channels. The media content delivery server 291 can also maintain static information such as icons and menu pages. The interfaces also include a carrier interface 211 allowing operation with mobile devices such as cellular phones operating in a particular cellular network. The carrier interface allows a carrier vending system to update subscriptions. Carrier interfaces 213 and 215 allow operation with mobile devices operating in other wireless networks. An abstract buy engine interface 243 provides communication with an abstract buy engine that maintains subscription information.

An authentication module 221 verifies the identity of mobile devices. A logging and report generation module 253 tracks mobile device requests and associated responses. A monitor system 251 allows an administrator to view usage patterns and system availability. According to various embodiments, the media content delivery server 291 handles requests and responses for media content related transactions while a separate streaming server provides the actual media streams. In some instances, a media content delivery server 291 may also have access to a streaming server or operate as a proxy for a streaming server. But in other instances, a media content delivery server 291 does not need to have any interface to a streaming server. In typical instances, however, the media content delivery server 291 also provides some media streams. The media content delivery server 291 can also be configured to provide media clips and files to a user in a manner that supplements a streaming server.

Although a particular media content delivery server 291 is described, it should be recognized that a variety of alternative configurations are possible. For example, some modules such as a report and logging module 253 and a monitor 251 may not be needed on every server. Alternatively, the modules may be implemented on another device connected to the server. In another example, the server 291 may not include an interface to an abstract buy engine and may in fact include the abstract buy engine itself. A variety of configurations are possible.

Figure 3:
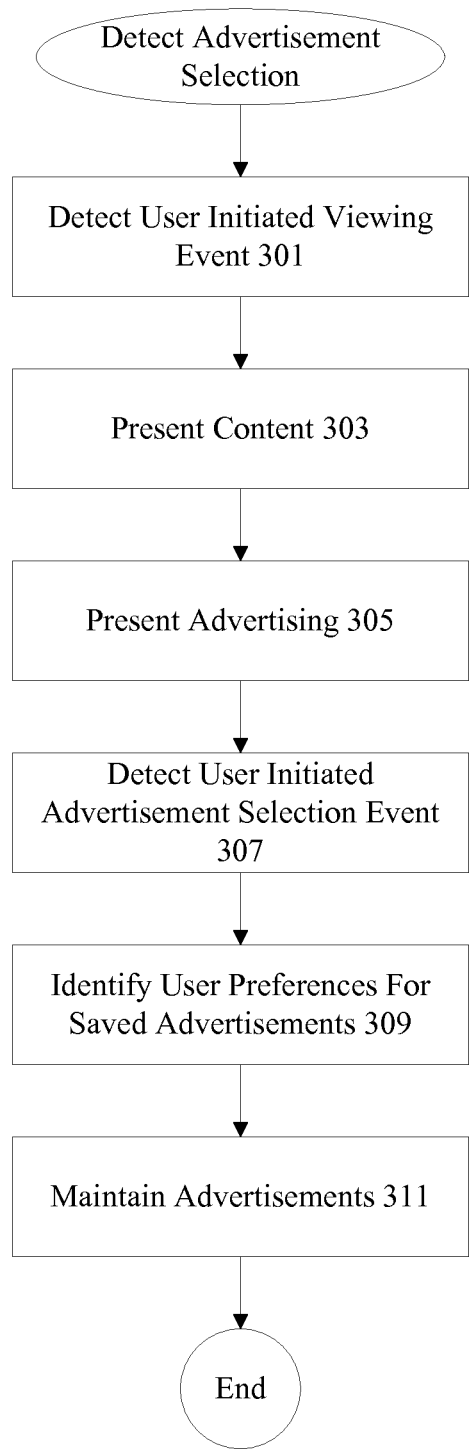
FIG. 3 illustrates a particular example of detecting advertisement selection.

FIG. 3 illustrates one example of a technique for detecting advertisement selection. According to various embodiments, a user initiated viewing event is detected at 301. At 303, content is presented. A user may be watching a video on a player or a device or may be browsing content on a website. At 305, advertising is presented. Advertising may be targeted to the user's interests or may correspond to the content being presented. At 307, a user initiated advertisement selection event is detected. The user initiated advertisement selection event may be a simple click of a link or banner.

According to various embodiments, selection of an advertisement provides the user with several options, including viewing the material now or saving the advertising for browsing later. Viewing the material now may disrupt a content viewing experience, but may be a preferred option for some users. The advertising can also be saved for perusal at a later time or on a different modality. According to various embodiments, a default option can be set to view advertising at a later time whenever an advertisement is selected during viewing of media materials including videos, movies, live broadcasts, etc. In particular embodiments, users can select to save advertising as well as links and information associated with advertising.

According to various embodiments, user preferences for saved advertisements are determined at 309. User preferences may indicate how a user wishes to save and subsequently explore advertising. In particular embodiments, advertisements, links, information, and associated advertisements are all added to a user profile. The advertisements may be presented at the end of a media program or during a specified advertising viewing period. In particular embodiments, the advertisements may also be presented at user request or sent by way of one or more modalities. In particular embodiments, mechanisms are provided to allow a user to share advertising with others who may be interested. Sharing may be implemented using messaging, email, peer-to-peer, and social networking mechanisms.

According to various embodiments, advertisements are maintained at 311. The saved advertisements can be maintained in a profile associated with the user or in some instances with a profile associated with a device.

Figure 4:
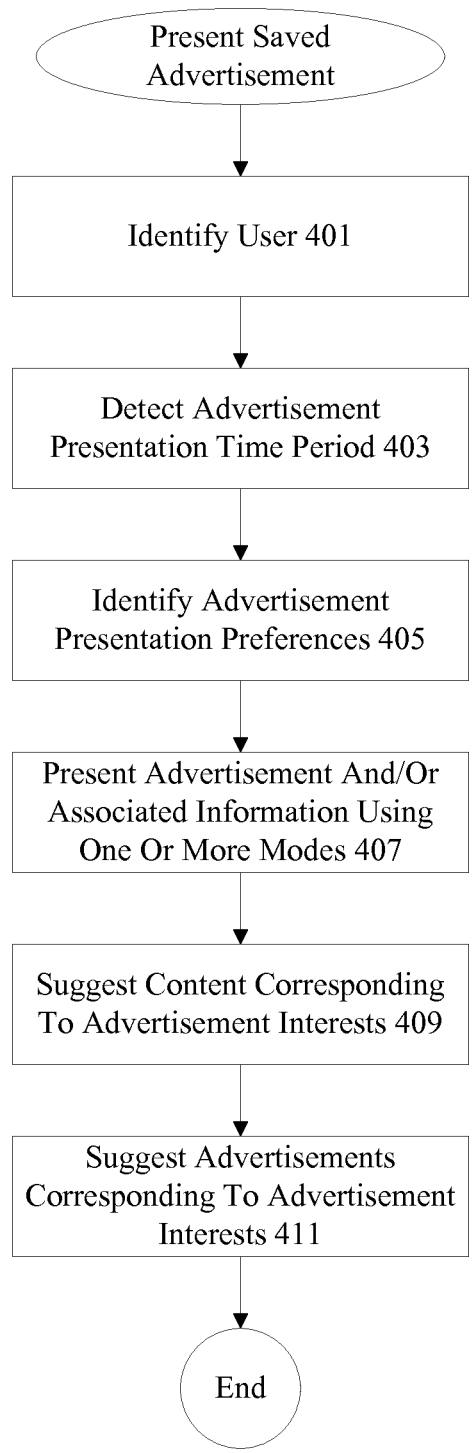
FIG. 4 illustrates a particular example of presenting saved advertisements.

FIG. 4 illustrates one mechanism for presenting saved advertisements. According to various embodiments, a user and/or device is identified at 401. In some instances, users may be registered to particular devices. At 403, an advertisement time period is detected. According to various embodiments, an advertisement time period is period of time selected by a user to view advertising. The time period may reside at the end of a media program or prior to the start of a subsequent media program. Alternatively, the time period may begin upon user request. In some instances, a media program does not begin until a user has viewed a particular number of advertisements in a saved advertisement queue.

At 405, advertisement presentation preferences are identified. Advertisement presentation preferences may include what type of information to present, how to present the information, as well as when. According to various embodiments, advertisements along with information, offers, and associated advertisements are all presented to the user. In particular embodiments, advertising is presented using one or more modes at 407. The advertising may be presented on a display or window, sent via messaging, email, or social networking services, or presented via other modalities.

According to various embodiments, saved advertisements are mined to determine user interests. Saved advertisements affirmatively indicate what the user is interested in perusing. According to various embodiments, saved advertisements are evaluated to identify not only other content of interest at 409, but other advertisements of interests as well 411. In particular embodiments, users interested in advertisements on camping products may be presented with options for additional media content on outdoor adventures. Users interested in advertisements on apparel may be presented with additional media content related to fashion. Similarly, users that select advertising on particular products may be presented with additional advertising for accessories associated with the products.

Figure 5:
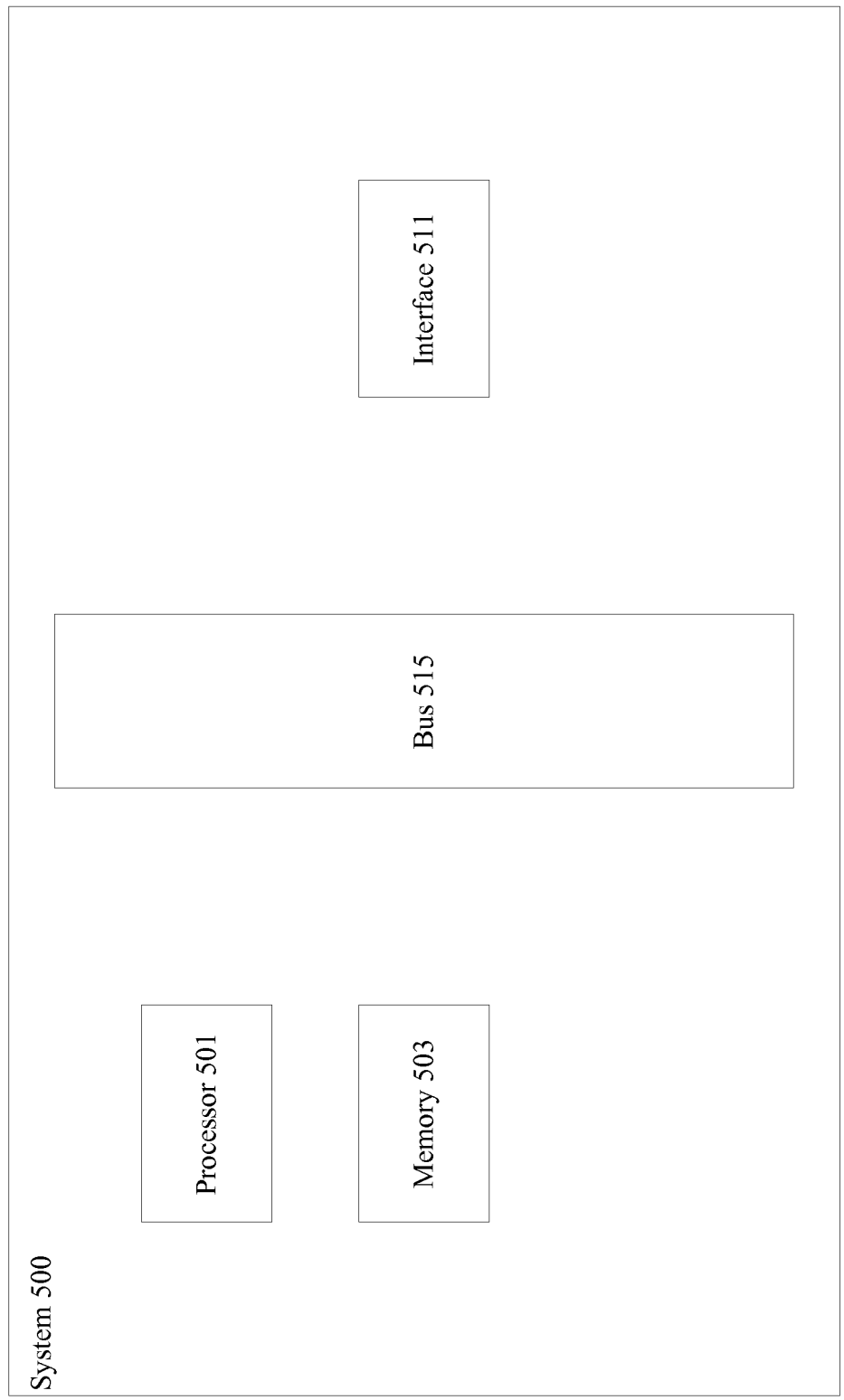
FIG. 5 illustrates a particular example of system.

FIG. 5 illustrates one example of a server that can be used to evaluated user response. According to particular embodiments, a system 500 suitable for implementing particular embodiments of the present invention includes a processor 501, a memory 503, an interface 511, and a bus 515 (e.g., a PCI bus or other interconnection fabric) and operates as a streaming server. When acting under the control of appropriate software or firmware, the processor 501 is responsible for modifying and transmitting live media data to a client. Various specially configured devices can also be used in place of a processor 501 or in addition to processor 501. The interface 511 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 500 is a content server that also includes a transceiver, streaming buffers, and a program guide database. The content server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server handles requests and responses for media content related transactions while a separate streaming server provides the actual media streams.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method for improving viewer experience of media content, the method to be executed by a system including a processor and memory, the method comprising:
   detecting, by the system, a user initiated viewing event;
   presenting, by the system, media content to a client device corresponding to the user initiated viewing event;
   presenting, by the system, one or more advertisements to the client device during presentation of the media content;
   detecting, by the system, one or more user initiated advertisement selection events, wherein the one or more user initiated advertisement selections events includes a mouse click to a website link;
   upon detecting one or more user initiated advertisement selection events, presenting, by the system, to the client device an option to view an advertisement now or save the advertisement for perusal at a later time or on a different modality, wherein a default option is set to view the advertisement at a later time;
   detecting, by the system, whether the user selects to view the advertisement now or save the advertisement for browsing later;
   if a user selection to play the advertisement now is detected, then playing, by the system, the advertisement immediately;
   if a user selection to save the advertising for browsing later is detected, then saving, by the system, the one or more advertisements for browsing later such that presenting the media content is not interrupted by the one or more advertisements being played;
   continuing, by the system, presentation of the media content until the media content is finished playing;
   determining, by the system, user preferences for saved advertisements, wherein the user preferences indicate how a user wishes to save and subsequently explore advertising, wherein determining user preferences includes saving advertisements, links, and information to a user profile, as well as saving user selections of whether to play the advertisement now or save the advertisement for browsing later; and
   maintaining, by the system, a plurality of saved advertisements, user selections for viewing the advertisements now or saving the advertisements for browsing later, specified advertising view periods, and modalities for viewing saved advertisements in the user profile associated with the user.

2. The method of claim 1, wherein the saved advertisements are presented using a separate modality.

3. The method of claim 1, wherein saved advertisements are presented with information, links, offers, and associated advertisements.

4. The method of claim 1, wherein the saved advertisements are presented after the user has finished viewing the media content.

5. The method of claim 1, wherein the saved advertisements are presented before the user begins viewing subsequent media content.

6. A system, comprising:
   a processor;
   memory; and
   one or more instructions stored in the memory to cause the processor to execute a method, the method comprising:
   detecting, at a server, a user initiated viewing event;
   presenting media content to a client device corresponding to the user initiated viewing event;
   presenting one or more advertisements to the client device during presentation of the media content;

detecting, at the server, one or more user initiated advertisement selection events, wherein the one or more user initiated advertisement selections events includes a mouse click to a website link;

upon detecting one or more user initiated advertisement selection events, presenting to the client device an option to view an advertisement now or save the advertisement for perusal at a later time or on a different modality, wherein a default option is set to view the advertisement at a later time;

detecting whether the user selects to view the advertisement now or save the advertisement for browsing later;

if a user selection to play the advertisement now is detected, then playing the advertisement immediately;

if a user selection to save the advertising for browsing later is detected, then saving the one or more advertisements for browsing later such that presenting the media content is not interrupted by the one or more advertisements being played;

continuing presentation of the media content until the media content is finished playing;

determining user preferences for saved advertisements, wherein the user preferences indicate how a user wishes to save and subsequently explore advertising, wherein determining user preferences includes saving advertisements, links, and information to a user profile, as well as saving user selections of whether to play the advertisement now or save the advertisement for browsing later; and maintaining a plurality of saved advertisements, user selections for viewing the advertisements now or saving the advertisements for browsing later, specified advertising view periods, and modalities for viewing saved advertisements in the user profile associated with the user.

7. The system of claim 6, wherein the saved advertisements are presented using a separate modality.

8. The system of claim 6, wherein saved advertisements are presented with information, links, offers, and associated advertisements.

9. The system of claim 6, wherein the saved advertisements are presented after the user has finished viewing the media content.

10. The system of claim 6, wherein the saved advertisements are presented before the user begins viewing subsequent media content.

11. A non-transitory computer readable medium storing one or more instructions to be executed by a system including a processor and memory, the instructions comprising:

detecting, by the system, a user initiated viewing event;

presenting, by the system, media content to a client device corresponding to the user initiated viewing event;

presenting, by the system, one or more advertisements to the client device during presentation of the media content;

detecting, by the system, one or more user initiated advertisement selection events, wherein the one or more user initiated advertisement selections events includes a mouse click to a website link;

upon detecting one or more user initiated advertisement selection events, presenting, by the system, to the client device an option to view an advertisement now or save the advertisement for perusal at a later time or on a different modality, wherein a default option is set to view the advertisement at a later time;

detecting, by the system, whether the user selects to view the advertisement now or save the advertisement for browsing later;

if a user selection to play the advertisement now is detected, then playing, by the system, the advertisement immediately;

if a user selection to save the advertising for browsing later is detected, then saving, by the system, the one or more advertisements for browsing later such that presenting the media content is not interrupted by the one or more advertisements being played;

continuing, by the system, presentation of the media content until the media content is finished playing;

determining, by the system, user preferences for saved advertisements, wherein the user preferences indicate how a user wishes to save and subsequently explore advertising, wherein determining user preferences includes saving advertisements, links, and information to a user profile, as well as saving user selections of whether to play the advertisement now or save the advertisement for browsing later; and maintaining, by the system, a plurality of saved advertisements, user selections for viewing the advertisements now or saving the advertisements for browsing later, specified advertising view periods, and modalities for viewing saved advertisements in the user profile associated with the user.

12. The non-transitory computer readable medium of claim 11, wherein the saved advertisements are presented using a separate modality.

* * * * *